United States Patent
Ramalingam et al.

(10) Patent No.: US 10,580,164 B2
(45) Date of Patent: Mar. 3, 2020

(54) AUTOMATIC CAMERA CALIBRATION

(71) Applicant: Microsoft Technology Licensing, LLC, Redmond, WA (US)

(72) Inventors: Ganesan Ramalingam, Bellevue, WA (US); Ramachandran Ramjee, Bangalore (IN); Romil Bhardwaj, Bangalore (IN); Gopi Krishna Tummala, Columbus, OH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 15/946,580

(22) Filed: Apr. 5, 2018

(65) Prior Publication Data

US 2019/0311494 A1    Oct. 10, 2019

(51) Int. Cl.
| | | |
|---|---|---|
| *G06K 9/00* | (2006.01) | |
| *G06T 7/80* | (2017.01) | |
| *G06T 7/73* | (2017.01) | |
| *G06K 9/62* | (2006.01) | |

(52) U.S. Cl.
CPC ............ *G06T 7/80* (2017.01); *G06K 9/00785* (2013.01); *G06K 9/6262* (2013.01); *G06K 9/6268* (2013.01); *G06T 7/73* (2017.01); *G06T 2207/20081* (2013.01); *G06T 2207/20084* (2013.01); *G06T 2207/30244* (2013.01); *G06T 2207/30252* (2013.01)

(58) Field of Classification Search
CPC ............ G06T 7/80; G06T 2207/10016; G06T 2207/30232; G06T 2207/30236; G06T 7/70; G06K 2009/00738; G06K 9/00208
See application file for complete search history.

(56) References Cited

U.S. PATENT DOCUMENTS

| | | | |
|---|---|---|---|
| 7,541,943 B2 | 6/2009 | Manor | |
| 7,949,150 B2 | 5/2011 | Haering et al. | |
| 9,286,678 B2 | 3/2016 | Zhu et al. | |
| 10,348,961 B2* | 7/2019 | Bae | |
| 2010/0066828 A1 | 3/2010 | Disaro et al. | |
| 2012/0293663 A1* | 11/2012 | Liu | G06T 7/246 348/169 |
| 2013/0188018 A1* | 7/2013 | Stevens | G06T 7/0004 348/46 |
| 2013/0191014 A1* | 7/2013 | Dalal | G08G 1/052 701/119 |
| 2016/0018212 A1* | 1/2016 | Rouh | G01B 11/002 348/135 |
| 2016/0350921 A1* | 12/2016 | Bataller | G06T 7/80 |

(Continued)

OTHER PUBLICATIONS

"AutoCalib Web Demo", Retrieved From: <<http://tiny.cc/autocalib>>, Retrieved on: Feb. 8, 2018, 7 Pages.

(Continued)

*Primary Examiner* — Li Liu

(74) *Attorney, Agent, or Firm* — Rainier Patents, P.S.

(57) ABSTRACT

This document relates to camera calibration. One example uses real-world distances and image coordinates of object features in images to determine multiple candidate camera calibrations for a camera. This example filters out at least some of the multiple candidate camera calibrations to obtain remaining calibrations, and obtains a final calibration for the camera from the remaining calibrations

20 Claims, 13 Drawing Sheets

(56) References Cited

U.S. PATENT DOCUMENTS

| | | | |
|---|---|---|---|
| 2017/0098304 A1 | 4/2017 | Blais-Morin et al. | |
| 2018/0120196 A1* | 5/2018 | Georgeson | G01M 5/0008 |
| 2018/0189532 A1* | 7/2018 | Bataller | G06K 7/10811 |
| 2018/0232909 A1* | 8/2018 | Gagnon | G06T 7/80 |

OTHER PUBLICATIONS

"Department of Transportation", Retrieved From: <<https://web6.seattle.gov/travelers/>>, Retrieved on: Feb. 8, 2018, 1 Page.

"Google Earth", Retrieved From: <<https://www.google.com/intl/en_in/earth/>>, Retrieved on: Feb. 8, 2018, 4 Pages "Manual on Uniform Traffic Control Devices", Retrieved From: <<https://mutcd.fhwa.dot.gov/>>, Dec. 2009, 2 Pages.

"Road Crash Statistics", Retrieved From: <<https://web.archive.org/web/20141127153100/http:/asirt.org/initiatives/informing-road-users/road-safety-facts/road-crash-statistics>>, Retrieved on: Nov. 27, 2014, 2 Pages.

"One Legacy of Tiananmen: China's 100 Million Surveillance Cameras", Retrieved from: <<https://blogs.wsj.com/chinarealtime/2014/06/05/one-legacy-of-tiananmen-chinas-100-million-surveillance-cameras/>>, Jun. 5, 2014, 2 Pages.

Bhardwaj, et al., "AutoCalib: Automatic Traffic Camera Calibration at Scale", In Proceedings of ACM BuildSys, Nov. 6, 2017, 10 Pages.

Dailey, et al., "An Algorithm to Estimate Mean Traffic Speed using Uncalibrated Cameras", In IEEE Transactions on Intelligent Transportation Systems, vol. 1, Issue 2, Jun. 2000, pp. 98-107.

Dawson, et al., "An Energy Minimization Approach to Automatic Traffic Camera Calibration", In IEEE Transactions on Intelligent Transportation Systems, vol. 14, Issue 3, Sep. 2013, pp. 1095-1108.

Dubská, et al., "Automatic Camera Calibration for Traffic Understanding", In Journal of British Machine Vision Conference, vol. 4, No. 6, Sep. 2014, 12 Pages.

Dubská, et al., "Fully Automatic Roadside Camera Calibration for Traffic Surveillance", In IEEE Transactions on Intelligent Transportation Systems, vol. 16, Issue 3, Jun. 2015, pp. 1162-1171.

Gebru, et al., "Using Deep Learning and Google Street View to Estimate the Demographic Makeup of the US", In Journal of Computing Research Repository, Feb. 2017, 41 Pages.

Hadi, et al., "Vehicle Detection and Tracking Techniques: A Concise Review", In International Journal of Signal & Image Processing (SIPIJ), vol. 5, Issue 1, Feb. 2014, 12 Pages.

Jain, et al., "Panoptes: Servicing Multiple Applications Simultaneously using Steerable Cameras", In Proceedings of 16th ACM/IEEE International Conference on Information Processing in Sensor Networks, Apr. 18, 2017, pp. 119-130.

Krizhevsky, et al., "ImageNet Classification with Deep Convolutional Neural Networks", In Advances in Neural Information Processing Systems, 2012, 9 Pages.

LeCun, et al., "Deep Learning", In Journal of Nature, vol. 521, May 28, 2015, pp. 436-444.

Lepetit, et al., "EPnP: An Accurate 0 (n) Solution to the PnP Problem", In International Journal of Computer Vision, vol. 81, Issue 2, Feb. 2009, 12 Pages.

Loewenherz, et al., "Video Analytics Towards Vision Zero", In ITE Journal, vol. 87, Issue 3, Mar. 2017, 6 Pages.

Muller, et al., "3-D Reconstruction of a Dynamic Environment with a Fully Calibrated Background for Traffic Scenes", In IEEE Transactions on Circuits and Systems for Video Technology, vol. 15, Issue 4, Apr. 2005, pp. 538-549.

Ren, et al., "Faster R-CNN: Towards Real-Time Object Detection with Region Proposal Networks", In Proceedings of Annual Conference on Neural Information Processing Systems, Dec. 7, 2015, 14 Pages.

Sochor, et al., "BrnoCompSpeed: Review of Traffic Camera Calibration and a Comprehensive Dataset for Monocular Speed Measurement", Retrieved from <<https://arxiv.org/pdf/1702.06441.pdf>>, Feb. 21, 2017, 10 Pages.

Song, et al., "Dynamic Calibration of Pan-Tilt-Zoom Cameras for Traffic Monitoring", In IEEE Transactions on Systems, Man, and Cybernetics, vol. 36, Issue 5, Oct. 2006, pp. 1091-1103.

Srivastava, et al., "Dropout: A Simple Way to Prevent Neural Networks from Overfitting", In Journal of Machine Learning Research, vol. 15, Issue 1, Jun. 2014, pp. 1929-1958.

Szegedy, et al., "Going Deeper with Convolutions", Retrieved from: <<https://arxiv.org/pdf/1409.4842.pdf>>, Sep. 17, 2014, 12 Pages.

Szeliski, Richard, "Computer Vision: Algorithms and Applications", In Publication of Springer, Sep. 3, 2010, 979 Pages.

Wang, et al., "Research on Lane-Marking Line Based Camera Calibration", In IEEE International Conference on Vehicular Electronics and Safety, Dec. 13, 2007, 6 Pages.

Yang, et al., "A Large-Scale Car Dataset for Fine-Grained Categorization and Verification", In Proceedings of IEEE Conference on Computer Vision and Pattern Recognition, Jun. 7, 2015, 11 Pages.

Zhang, et al., "Practical Camera Cailbration from Moving Objects for Traffic Scene Surveillance", In EEEE Transactions on Circuits and Systems for Video Technology, vol. 23, Issue 3, Mar. 2013, pp. 518-533

* cited by examiner

Vehicle Feature Distance Table 600

| Vehicle Model | Center Tail Lamp | Right Tail Lamp | Left Mirror | Right Mirror | License Plate |
|---|---|---|---|---|---|
| Toyota Camry® | 1.22 | 1.52 | 2.79 | 3.56 | 0.83 |
| Honda Civic® | 1.21 | 1.49 | 2.8 | 3.54 | 0.82 |
| Chevy Silverado® | 1.42 | 1.75 | 3.1 | 3.89 | 0.88 |
| Ford F-150® | 1.44 | 1.74 | 3.11 | 3.9 | 0.89 |
| Ram 1500® | 1.43 | 1.78 | 3.15 | 3.92 | 0.9 |
| Nissan Altima® | 1.19 | 1.54 | 2.7 | 3.45 | 0.79 |
| Honda Accord® | 1.25 | 1.55 | 2.67 | 3.54 | 0.81 |
| Honda CRV® | 1.2 | 1.47 | 2.75 | 3.5 | 0.8 |
| Hyundai Elantra® | 1.17 | 1.49 | 2.74 | 3.49 | 0.77 |
| Chevy Cruze® | 1.15 | 1.51 | 2.7 | 3.47 | 0.78 |

FIG. 6

Candidate Calibration Table 700

| Calibration No. | Image No. | Vehicle Model | R | T |
|---|---|---|---|---|
| 1 | 1 | Toyota Camry® | R(1, 1) | T(1, 1) |
| 2 | 1 | Honda Civic® | R(1, 2) | T(1, 2) |
| 3 | 1 | Chevy Silverado® | R(1, 3) | T(1, 3) |
| 4 | 1 | Ford F-150® | R(1, 4) | T(1, 4) |
| 5 | 1 | Ram 1500® | R(1, 5) | T(1, 5) |
| 6 | 1 | Nissan Altima® | R(1, 6) | T(1, 6) |
| 7 | 1 | Honda Accord® | R(1, 7) | T(1, 7) |
| 8 | 1 | Honda CRV® | R(1, 8) | T(1, 8) |
| 9 | 1 | Hyundai Elantra® | R(1, 9) | T(1, 9) |
| 10 | 1 | Chevy Cruze® | R(1, 10) | T(1, 10) |
| 11 | 2 | Toyota Camry® | R(2, 1) | T(2, 1) |
| 12 | 2 | Honda Civic® | R(2, 2) | T(2, 2) |
| 13 | 2 | Chevy Silverado® | R(2, 3) | T(2, 3) |
| 14 | 2 | Ford F-150® | R(2, 4) | T(2, 4) |
| 15 | 2 | Ram 1500® | R(2, 5) | T(2, 5) |
| 16 | 2 | Nissan Altima® | R(2, 6) | T(2, 6) |
| 17 | 2 | Honda Accord® | R(2, 7) | T(2, 7) |
| 18 | 2 | Honda CRV® | R(2, 8) | T(2, 8) |
| 19 | 2 | Hyundai Elantra® | R(2, 9) | T(2, 9) |
| 20 | 2 | Chevy Cruze® | R(2, 10) | T(2, 10) |

FIG. 7

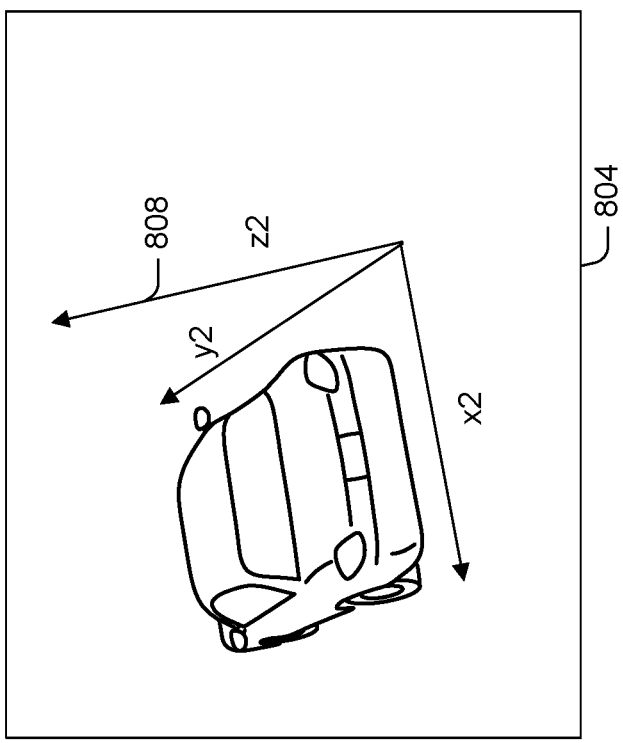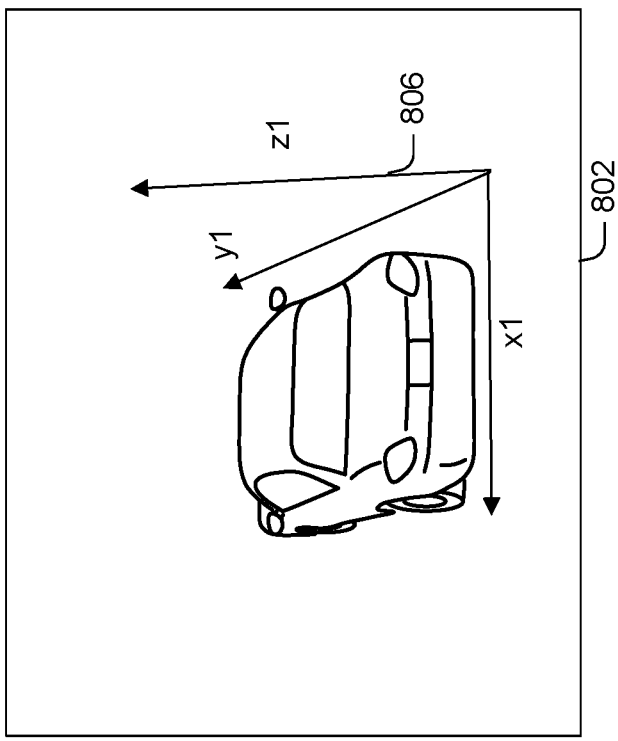
FIG. 8

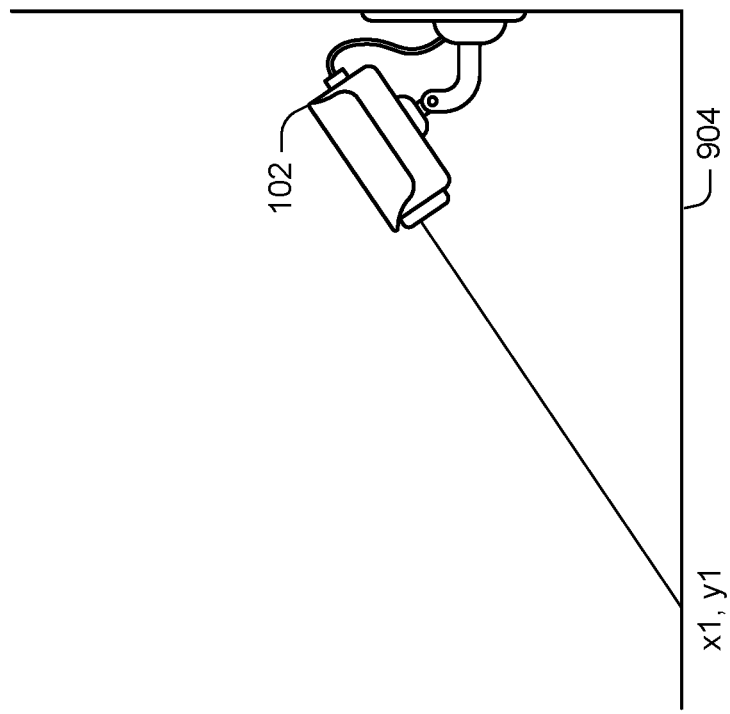
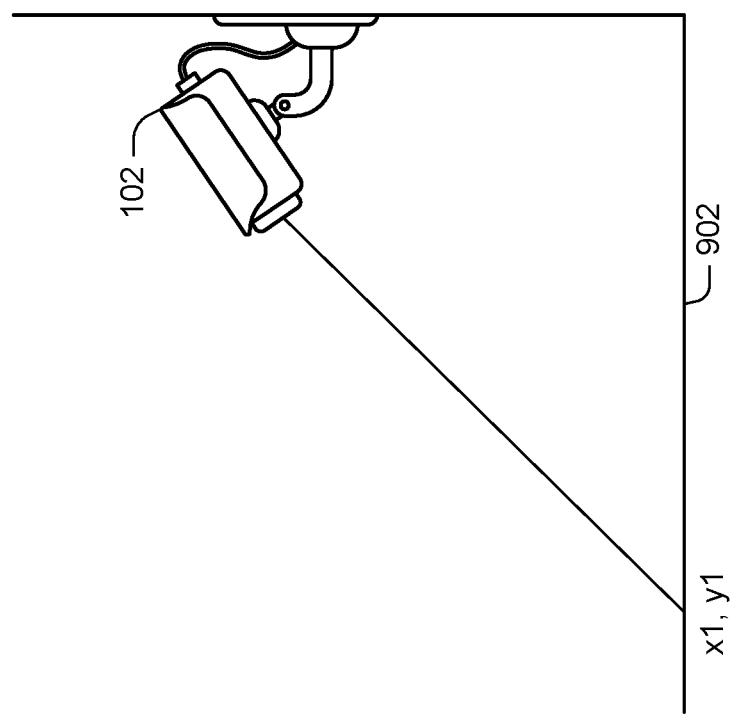
FIG. 9

AUTOMATIC CAMERA CALIBRATION

BACKGROUND

When a camera is deployed to capture images, it is possible to determine real-world distances between different points in those images. To do so, the camera is first calibrated by estimating certain camera parameters. One way to calibrate a camera is to use real-world coordinates of known landmarks to derive the camera parameters. However, this approach can involve tremendous amounts of human effort, and also needs to be re-performed if the camera changes any pan, tilt, or zoom parameters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for calibrating cameras. One example includes a method or technique that can be performed on a computing device. The method can include obtaining input images captured by a camera, processing the images to identify image coordinates of object features of objects shown in the images, and accessing a database of real-world distances between the object features for different object types. The method or technique can also include using the real-world distances and the image coordinates of the object features, determining multiple candidate camera calibrations for the camera, filtering out at least some of the multiple candidate camera calibrations to obtain remaining calibrations, and obtaining a final calibration for the camera from the remaining calibrations.

Another example includes a system that includes a camera configured to capture images of objects, a hardware processing unit, and a storage resource. The storage resource can store computer-readable instructions which, when executed by the hardware processing unit, cause the hardware processing unit to obtain the images captured by the camera, determine image coordinates of object features of objects shown in the images, and provide the image coordinates and real-world distances between the object features for different object types to a perspective-n-point solver that outputs multiple candidate camera calibrations. The computer-readable instructions can also cause the hardware processing unit to filter out at least some of the multiple candidate camera calibrations to obtain remaining calibrations and use the remaining calibrations to obtain a final calibration of the camera.

Another example includes a system that includes a hardware processing unit and a storage resource. The storage resource can store computer-readable instructions which, when executed by the hardware processing unit, cause the hardware processing unit to obtain a neural network that is trained to classify objects found in images. The neural network can have a final layer that identifies specific object types. The computer-readable instructions can cause the hardware processing unit to modify the final layer of the neural network to obtain a modified neural network, and the modified neural network can output image coordinates of specific object features. The computer-readable instructions can cause the hardware processing unit to relearn weights of the final layer of the modified neural network using training images having annotated locations of the specific object features, and determine image coordinates of individual object features in other images using the modified neural network.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 6 and 7 illustrate example data tables, consistent with some implementations of the present concepts.

FIGS. 8 and 9 illustrate exemplary calibration filtering techniques, consistent with some implementations of the present concepts.

DETAILED DESCRIPTION

Overview

Figure 1:
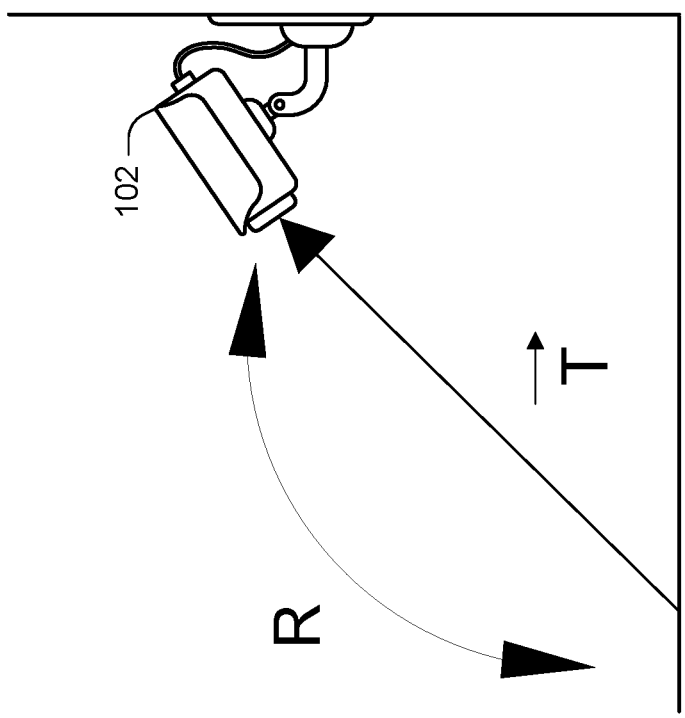
FIG. 1 illustrates an example camera, consistent with some implementations of the present concepts.

As previously noted, certain approaches for camera calibration can have certain drawbacks. For example, manual techniques can involve physically measuring the orientation of an installed camera, e.g., using an electronic compass or other measurement instrument. However, existing electronic compasses lack sufficient accuracy to allow for precise camera calibration. Another manual technique involves calibrating cameras from the real-world coordinates of known landmarks, such as road markings, electric poles, etc., but this approach is also error-prone and requires significant manual effort. Further, depending on camera placement, these landmarks can be occluded and thus difficult to use for camera calibration.

Automated approaches for camera calibration are also possible. For example, one approach is to use vanishing points and the known average size of vehicles to automatically calibrate a traffic camera. However, this approach relies on the assumption that vehicles move in a straight line. Other approaches to automatic traffic camera calibration assume known lane widths, known mean vehicle sizes or mean vehicle speeds, etc. These assumptions can limit the applicability of these techniques.

The disclosed implementations provide a mechanism for calibrating a camera that overcomes these deficiencies of the aforementioned techniques. Generally, the disclosed implementations use known physical dimensions of certain objects, such as automobiles, airplanes, boats, etc. For the following discussion, automobiles will be used to illustrate various camera calibration techniques, although the disclosed implementations are readily applicable to other types of objects.

In some implementations, a database may provide the physical distance between respective features of a particular vehicle make and model, such as a Toyota Camry®. For example, the database may convey the distance between the center of left rear tail lamp and the center of the right rear tail lamp, the distance between the center of left rear tail lamp and the center of the license plate, etc. Given these physical dimensions and an image that includes a Toyota Camry®, a camera calibration can be computed.

Thus, one approach to camera calibration using known physical dimensions of objects, such as vehicles, would be to obtain numerous pictures taken by the camera, find those pictures that include a specific vehicle model, and use those pictures to calibrate the camera. However, this might not be possible or optimal for various reasons. For example, the camera may be positioned relatively far away from the vehicles that it captures, and/or may not be a particularly high-resolution camera. Thus, it may be relatively difficult to accurately classify each vehicle captured by the camera.

The present implementations can overcome the aforementioned problems and allow for camera calibration even with relatively low-resolution images. For example, consider an image that lacks sufficient resolution to accurately perform vehicle recognition, e.g., existing algorithms cannot accurately classify the make and model of the vehicle in the image because of the relatively low resolution. Nevertheless, given such an image, it may still be feasible to accurately identify the location of specific vehicle features in the image, such as the tail lamps, license plate, etc. Given enough pictures taken by the camera over time, certain popular vehicle models will tend to show up consistently in the images. For example, consider a traffic camera. Even if the traffic camera lacks sufficient resolution to accurately identify the make and model of each automobile captured by the camera, we can still assume that, over time, the camera will take many pictures of popular automobiles.

Generally, the disclosed implementations can rely on the assumption that, over time, relatively common vehicles will tend to show up in images taken by a given camera. The general approach is to compute different camera calibrations using known dimensions of different common automobile models. Some of the calibrations will be based on automobile models that are not present in the images, and other calibrations will be based on automobile models that are present in the images. The disclosed implementations can filter out calibrations that are outliers using various techniques discussed herein. Intuitively, the outlier calibrations are likely to be those calibrations that are based on automobile models that are absent from those images. Thus, the remaining calibrations are likely to be based on automobile models that do actually appear in the images. Then, a final calibration can be derived from the remaining calibrations.

Note that this allows us to leverage the physical traits of known automobile models to calibrate the camera without necessarily knowing that those automobile models are present in images. In other words, the disclosed implementations do not require recognizing the automobile models in the images. As a consequence, the disclosed implementations can be used even for images that lack sufficient resolution for accurate automobile model recognition.

Example Scenario

FIG. 1 shows an example camera 102. The camera has intrinsic parameters such as the focal length and distortion matrix, and extrinsic parameters such as orientation, represented by a rotation matrix R, and real-world position, represented by 3-dimensional coordinates T. The intrinsic parameters can be determined from the make and model of the camera. Thus, the disclosed implementations focus on estimating extrinsic parameters R and T from actual images captured using the camera.

R and T are components of a model known as the pinhole camera model, which describes the geometric relationship between the 2D image-plane (i.e., pixel positions in an image captured by a camera) and the 3D Ground Coordinate System (GCS), which is some fixed coordinate system in which real-world coordinates are measured. Let the image plane be represented by the UV plane and the GCS be represented by the (XYZ) space. The following equation relates the pixel position (u, v) with its respective GCS coordinates (x, y, z) as:

$$s \begin{bmatrix} u \\ v \\ 1 \end{bmatrix} = \begin{bmatrix} f_x & 0 & C_x \\ 0 & f_y & C_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x \\ y \\ z \\ 1 \end{bmatrix} \quad \text{(equation 1)}$$

where s is a scaling factor, $f_x$ and $f_y$ are focal lengths of camera along x and y axis of camera respectively, and ($c_x$, $c_y$) represents the image center of the camera. Note that $$R = \begin{bmatrix} r_{11} & r_{12} & r_{13} \\ r_{21} & r_{22} & r_{23} \\ r_{31} & r_{32} & r_{33} \end{bmatrix}$$

is the rotation matrix of the camera, and $$T = \begin{bmatrix} t_1 \\ t_2 \\ t_3 \end{bmatrix}$$

is the translation matrix of the camera.

Figure 2:
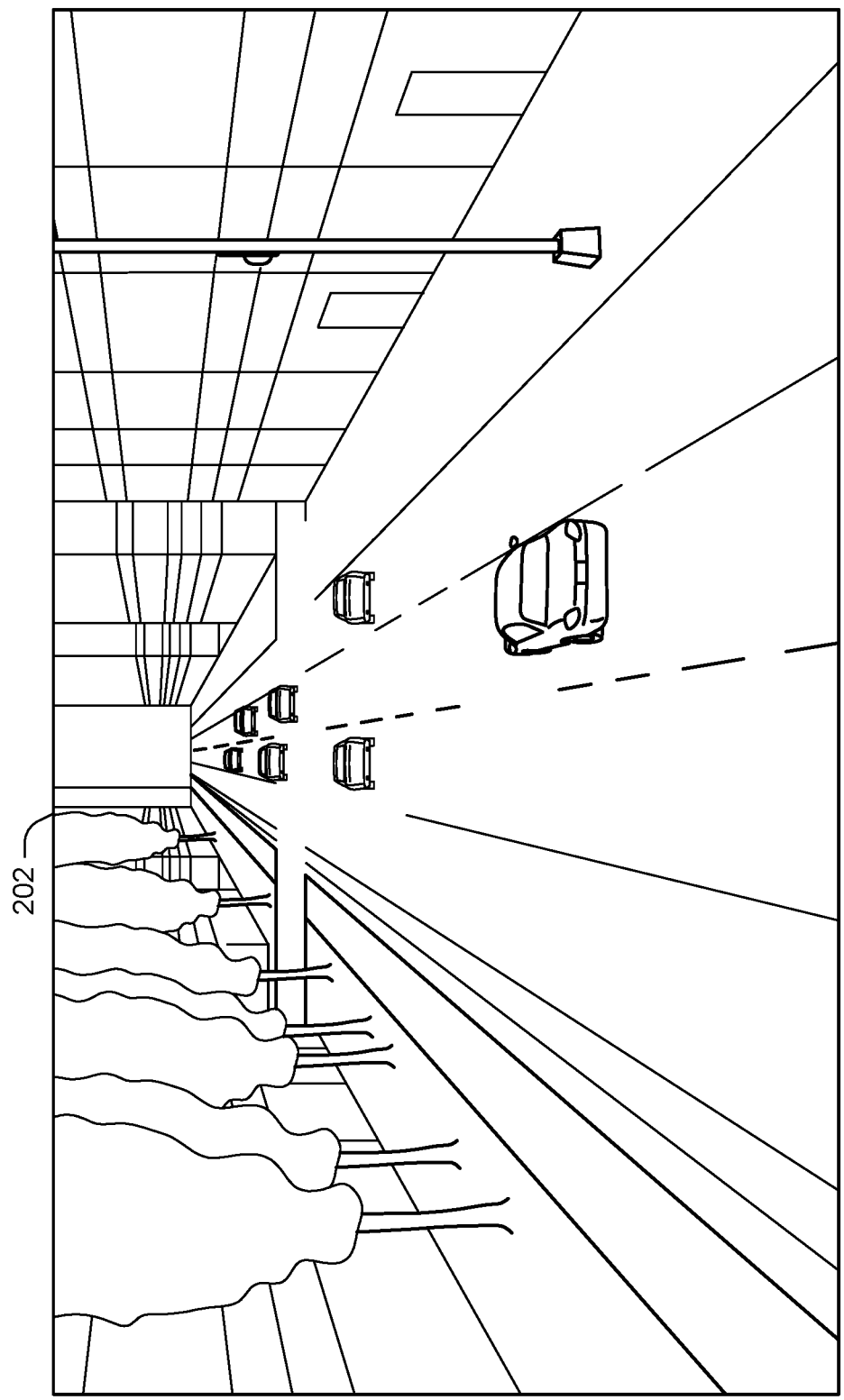
FIGS. 2 and 4 illustrate an example image captured by a camera, consistent with some implementations of the present concepts.

FIG. 2 shows an example image 202 captured by camera 102. As can be seen in FIG. 2, image 202 includes automobiles as well as various surroundings such as might be found in an urban setting. For example, image 202 might be captured by the camera if the camera is deployed on a traffic light, street sign, street lamp, etc. The following implementations discuss how the automobiles in the image can be used to calibrate the camera, e.g., to determine values of R and T for the camera. Once established, these values can be used to derive a real-world location of any point in another image taken by the camera, which can lead to various useful applications discussed elsewhere herein.

Example Camera Calibration Method

Figure 3:
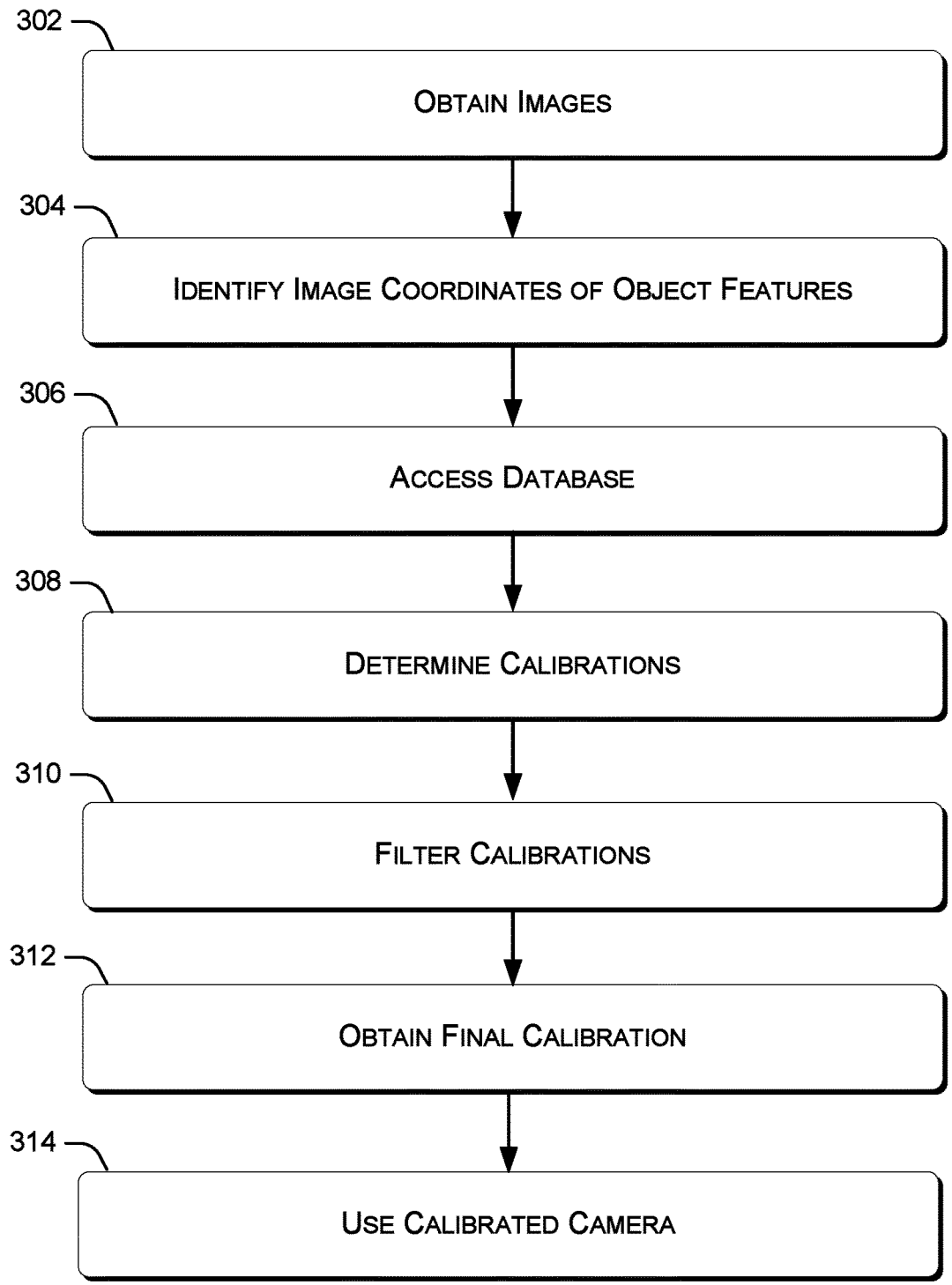
FIGS. 3 and 10 illustrate example methods or techniques, consistent with some implementations of the present concepts.

The following discussion presents an overview of functionality that can allow camera calibrations to be performed. FIG. 3 illustrates an exemplary method 300, consistent with the present concepts. As discussed more below, method 300 can be implemented on many different types of devices, e.g., by one or more cloud servers, by a client device such as a laptop, tablet, or smartphone, or by combinations of one or more servers, client devices, directly on a camera, etc.

Method 300 begins at block 302, where images are obtained. For example, the camera being calibrated can capture various images over time. In some cases, the images can be processed with a detector to determine whether the images include vehicles, and images lacking vehicles can be discarded.

Method 300 continues at block 304, where image coordinates of object features are identified in objects shown in the images. In some implementations, a classifier such as a deep neural network is applied to the images. For example, the classifier can be trained to take input images and output image plane coordinates of specific object features in the input images. In the case where the objects are automobiles, the features can be externally-visible parts of the car such as the left and right side mirrors, left and right tail lamps, center tail lamp, license plate, tires, etc. Note that it may be preferable to use features in different planes, e.g., the left tail lamp, license plate, and right tail lamp may lie in the same plane and thus it may be preferable to use at least one other feature, e.g., a particular tire, the right or left side mirror, etc., that does not lie in the same plane as the other features.

Method 300 continues at block 306, where a database of real-world distances between object features is accessed. For example, the database can identify specific object types (e.g., automobile models) and physical relationships between the above-mentioned physical features. As one example, the left tail lamp can be fixed as the origin for each car, and then the relative distances of the other features from the left tail lamp can be set forth in the database. In one implementation, the database has the top 10 most popular vehicle models and provides the physical relationships between the vehicle features for each of these models.

Method 300 continues at block 308, where multiple object-type specific calibrations are determined for each image using the real-world distances and the image plane coordinates of the object features. For example, given an input image with a single car and a database of automobile features for 10 different automobiles, 10 possible calibrations can be computed—one for each automobile model in the database. This can be done for multiple different images, and/or for multiple different automobiles shown in a given image.

Method 300 continues at block 310, where filtering is performed on the determined calibrations. For example, outliers can be discarded using various techniques.

One filtering technique referred to herein as an "orientation filter" might determine a Z axis unit vector for each calibration, where the Z axis unit vector determines an orientation of the ground plane for that calibration. The orientation filter can then determine a mean Z axis unit vector from the individual Z axis unit vectors for the calibrations. The mean Z axis unit vector can be obtained by adding the individual Z axis unit vectors together to obtain another vector, and dividing that vector by its own length. Next, the orientation filter can determine the angular deviation of each Z axis unit vector from the mean Z axis unit vector, and discard a specified percentage of calibrations that have the greatest angular deviations.

Another filtering technique referred to herein as a "displacement filter" might compute the median distance from the camera to a fixed point on the ground in the image plane, e.g., the image center, and discard a specified percentage of calibrations that have distances to that point furthest from the median.

Method 300 continues at block 312, where a final calibration is obtained. For example, the final calibration might be obtained by performing an averaging operation on certain calibration values from whatever calibrations remain after block 310. The term "averaging" can refer to calculating any of the mean, median, or mode, as discussed elsewhere herein. In one specific implementation, the mean Z axis unit vector of the Z axis unit vectors of the remaining calibrations, calculated as discussed above with respect to the orientation filter, is used as a final Z axis unit vector for the final calibration. Mutually orthogonal X and Y axis unit vectors can be determined for the final calibration, in some cases, at random.

Method 300 continues at block 314, where the final calibration is used for various applications. For example, the final calibration can be used to determine vehicle speed, identify near-misses, detect traffic congestion, etc.

Example Vehicle Detection

Figure 4:
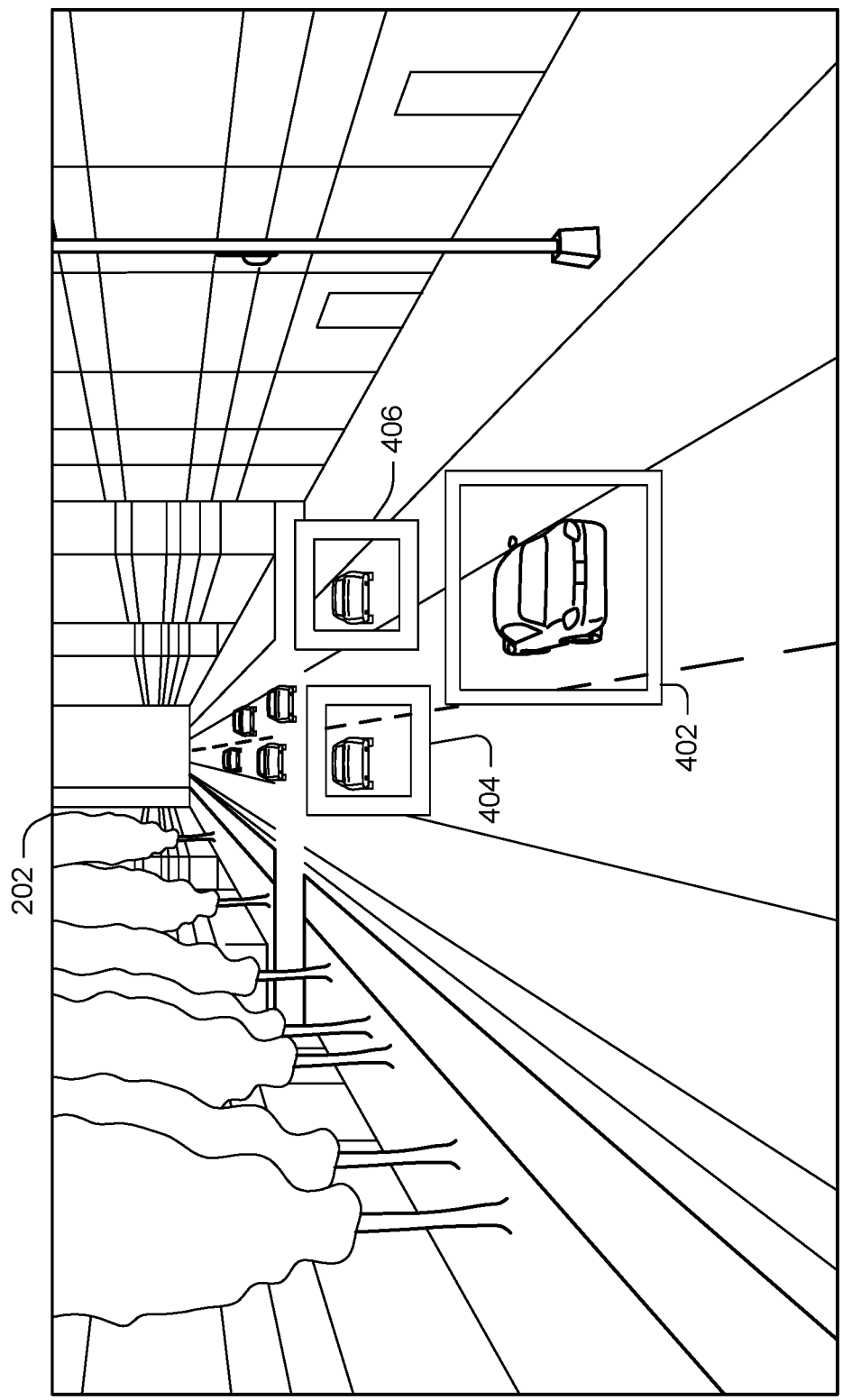

As noted above, block 302 can involve detecting certain objects in the input images. FIG. 4 shows an output of block 302 where three vehicles have been detected and identified using bounding boxes 402, 404, and 406, respectively. Various techniques can be used for object detection, including background-subtraction techniques, Haar-based classifiers, and/or deep neural networks. In one specific implementation, vehicles are detected using a background-subtraction technique and a deep neural network approach known as Faster R-CNN.

Note that in some cases, the camera 102 may take static images, and in other cases, the camera may generate video. When the camera generates static images (e.g., one image per second), the vehicle detection and subsequent processing can be performed on every image, every other image etc. When the camera generates video, the vehicle detection may be performed on one frame for each period of time, e.g., one frame for every five seconds of video. This is generally sufficient to ensure that each vehicle is only processed in one images.

Example Detected Object Features

Figure 5B:
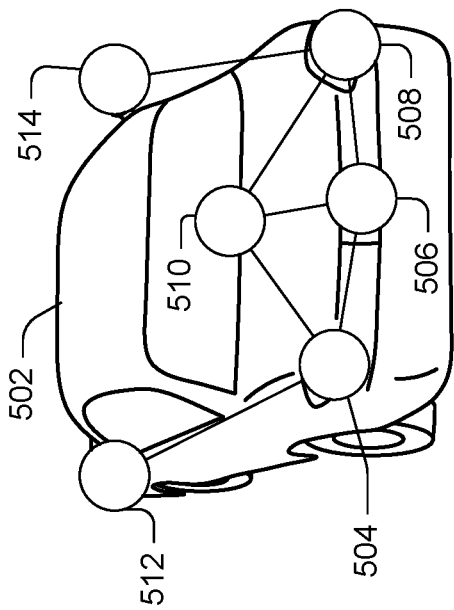
FIGS. 5A, 5B, and 5C illustrate exemplary image processing steps, consistent with some implementations of the present concepts.
Figure 5C:
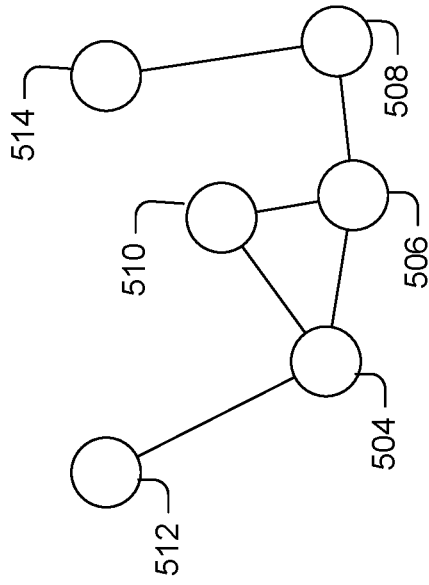
Figure 5A:
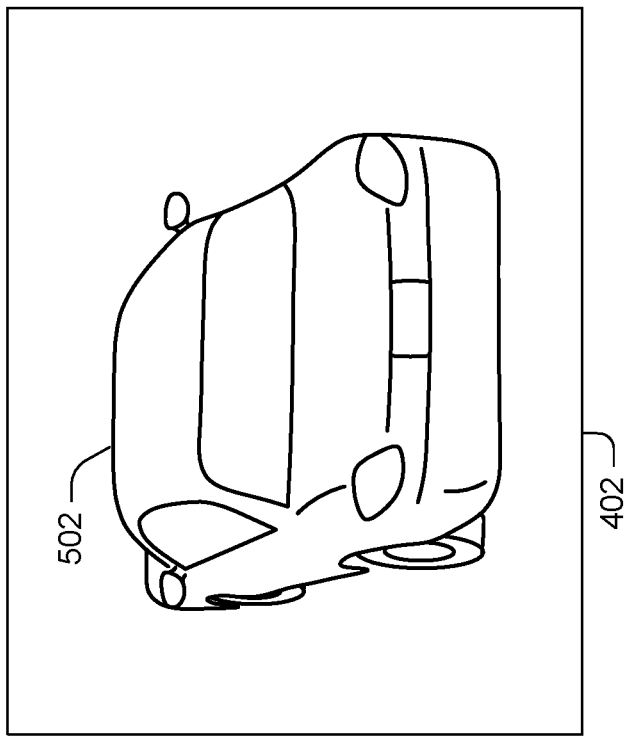

As noted above, block 304 of method 300 can involve detecting certain object features on objects identified in the images. FIG. 5A illustrates an example where the object is an automobile 502. Given a bounding box around an identified object, in this case automobile 502, vehicle features can be identified as shown in FIGS. 5B and 5C. FIG. 5C shows these vehicle features in image space without the underlying vehicle. As can be seen, the vehicle features can include left tail lamp 504, license plate 506, right tail lamp 508, center tail lamp 510, left mirror 512, and right mirror 514.

Example Vehicle Model Database

FIG. 6 shows an example vehicle feature distance table 600. Generally, table 600 uses the center of the left tail lamp of a given vehicle model as the origin and gives real-world distances of other vehicle features from the origin on a model-specific basis. For example, the center of the left mirror is 2.79 meters away from the center of the left tail lamp on a Toyota Camry®, and 2.8 meters away on a Honda Civic®. Likewise, the center of the license plate is 0.88 meters away from the center of the left tail lamp on a Chevy Silverado® and is 0.78 meters away on a Chevy Cruze®. Generally, table 600 can be viewed as providing some real-world known distances that can be leveraged to perform camera calibration, as discussed elsewhere herein. Note that table 600 shows exemplary values for illustration purposes only.

Note that Applicant does not have any relation to Toyota Motor Corp., Honda Motor Company, General Motors Company, any other business entities mentioned in this document. Real life automobile models are mentioned wherever possible solely to aid the reader in understanding the present concepts.

Example Candidate Calibrations

Equation 1, given above, can be used to solve for R and T under the following circumstances. First, obtain n point-correspondences, consisting of both the real-world ground coordinate system coordinates as well as the corresponding image coordinates of n≥4 different points. In addition, obtain the camera's intrinsic parameters $c_x$ and $c_y$, which may be obtained by knowing the model of the camera. Solving for the camera's extrinsic parameters R and T given the intrinsic parameters and the n point correspondences is known as the perspective-n-point problem. Generally, the term "perspective-n-point solver" as used herein refers to any algorithm that outputs R and T given a set of points represented in image coordinates and 3D locations for each of those points. There are existing solutions that will calculate the R and T, e.g., an efficient O(n) implementation is available in OpenCV (the open source computer vision library).

One way to use the perspective-n-point solver is to provide the perspective-n-point solver with the image coordinates of the detected vehicle features together with the information from the vehicle model database. The perspective-n-point solver can then output the real-world coordinate system coordinates of the vehicle features. The real-world coordinate system for each vehicle image can be different, e.g., the axes of the vehicle in a given image can include an x axis that runs parallel to the rear of the car, a y axis that runs parallel to the side of the car, and a z axis that is perpendicular to the x and y axis. Note that, in some cases, the vehicle pose can be estimated and used to determine which features are visible in a given image, and the image coordinates of the visible features can be provided to the perspective-n-point solver.

For a given vehicle identified in a given image, multiple candidate calibrations can be computed. For example, in some implementations, one candidate calibration is computed for each of the top-ten most popular vehicle models. FIG. 7 shows a set of example candidate calibrations in candidate calibration table 700. Table 700 shows a total of 20 calibrations for two images, image 1 and image 2. There are ten vehicle-specific candidate calibrations for image 1, and ten vehicle-specific candidate calibrations for image 2. Each calibration has a corresponding values for R and T, e.g., R(1, 9) implies values for R calculated from image one using physical characteristics of vehicle 9 (e.g., a Hyundai Elantra®), and T(2, 7) implies values from T calculated from image 2 using physical characteristics of vehicle 7 (e.g., a Honda Accord®).

Filtering

There may be various sources of error in the candidate calibrations computed as discussed above. One source of error could be that the trained model that annotates vehicle features, e.g., in block 304 of method 300, may not compute exact x and y coordinates for each image. A deviation of one or two pixels can still be sufficient to affect the calibration. Moreover, recall that the training data for the feature identification model can include manually annotated images. In some cases, the manual annotations may not accurately identify the centroid of a given feature. Thus, the model itself may be trained on imperfect training data.

Furthermore, consider a given image of a vehicle used to obtain a training calibration. Even if the vehicle is one of the top-ten vehicle models in the database, there are still 9 other candidate calibrations computed for the other 9 vehicles. Furthermore, sometimes the vehicle in the image will not be any of the top 10 vehicles in the database. As a consequence, many of the candidate calibrations are calculated from real-world coordinate values that are incorrect.

Moreover, note that each calibration has its own ground coordinate system. The ground coordinate system of a given calibration produced from a vehicle instance depends on the vehicle position and orientation. Specifically, the 3 axes of this ground coordinate system correspond to the 3 axes of the 3D bounding box of the vehicle, with the origin at a specified point, such as the left tail lamp or a point on the ground directly below the left tail lamp. The filtering techniques discussed herein exploit the following observations to deal with the set of calibrations with differing ground coordinate systems.

One observation is that, for certain applications that involve determining the real-world distance between two points in the image, knowing the ground (X-Y) plane of each calibration is sufficient, e.g., without knowing the orientation of the X and Y axes. This observation follows from the fact that the calibration can be used to map any point $p_i$ in the image to a real-world point $p_r$, given some real-world coordinate of $p_r$. For vehicular applications, the height of point $p_r$ above the road (e.g., the ground plane) of a given vehicle feature can be used as a known coordinate to determine the other real-world coordinates of that vehicle feature. Any two calibrations with the same ground plane (X-Y plane) but different X and Y axes will be equivalent for mapping image-points with known z-values. This is because the road is typically flat and the rotation around the Z axis does not matter. Example applications that rely on the relative distance between two points include near-miss detection and vehicle speed detection, as discussed elsewhere herein.

Another observation is that, barring errors, the ground plane of the generated calibrations should agree with each other. In other words, the X-Y plane for any two calibrations should be the same even though the X and Y axes may not be the same, e.g., the X and Y axes can be rotated 360 degrees around the Z axis and the X-Y plane does not change. These observations hold true provided the road lies in a single plane.

As noted previously, each calibration is represented by the pair (R,T) of a rotation and translation matrix. The rotation matrix R is a 3×3 matrix and T is a 3×1 vector. The third column of the rotation-matrix R represents the unit vector along the Z axis (of its GCS) and, hence, determines the orientation of the X-Y plane. This unit vector is referred to herein as the orientation of the calibration.

FIG. 8 shows two example images 802 and 804, each of which has a respective calibration. Each calibration has a respective ground coordinate system 806 and 808, respectively, defined by three axes. The ground plane (X-Y plane) is different for each calibration. As a consequence, the Z axis of calibration 802 has a different orientation than the Z axis of calibration 804.

In addition, note that calibrations with the same orientation have parallel X-Y planes, but do not necessarily have the same X-Y plane. In some implementations, a metric is computed that provides a measure of the distance between such parallel X-Y planes as follows. First, the disclosed implementations identify a region of the image as the "focus region" (e.g., the road, defined as the regions where cars are detected). Let p denote the center of this region. For each calibration $c_i$, the point p can be mapped to the corresponding real-world point $p_i$ in the ground plane and compute the distance $d_i$ between the camera and point $p_i$. This distance $d_i$ is referred to the displacement of the calibration $c_i$.

FIG. 9 illustrates calibrations with different displacements. For example, consider a point x1, y1 in the image plane. FIG. 9 shows a calibration 902 where the camera is calibrated such that the camera is a relatively far distance from x1, y1. Calibration 904 shows a different calibration that results in a smaller distance from x1, y1. For two calibrations with the same orientation, the difference in their displacements is a measure of the distance between their (parallel) X-Y planes. In particular, they have the same X-Y plane if and only if their displacements are the same.

The disclosed implementations filter outlier calibrations using both orientation and displacement. Starting from a set of candidate calibrations, the various outlier calibrations can be removed from the set as follows. Let $\vec{z}_l$ denote the orientation of a candidate calibration $c_i$, where $\vec{z}_l$ is a unit vector along the Z axis and thus determines the orientation of the X-Y plane. Let $\vec{z}_{avg}$ and elsewhere below denote the average, such as the mean, of all $\vec{z}_l$. As noted previously, $\vec{z}_{avg}$ can be obtained by adding the individual Z axis unit vectors $\vec{z}_l$ together to obtain another vector, and dividing that vector by its own length. The angle between any individual Z axis unit vector $\vec{z}_l$ and $\vec{z}_{avg}$ is a measure of how much the orientation of $c_i$ deviates from the average orientation. Some implementations perform a first orientation filter step that removes a specified percentage, e.g., 25% of the calibrations with the largest angular deviation from the average orientation. This leaves a remaining percentage, e.g. top 75% of calibrations, with the smallest angular deviation from the average orientation in the set of candidate calibrations.

Next, the disclosed implementations can compute the displacement of the remaining candidate calibrations and apply a displacement filter. For example, this filter can sort the displacement for each of the remaining candidate calibrations, determine the median displacement, and retain a specified percentage of candidate calibrations. For example, if the specified percentage is 50%, the top 25% of candidate calibrations having the largest displacement and the bottom 25% of candidate calibrations having the smallest displacement can be removed by this filter.

Next, the disclosed implementations can apply orientation-based filtering again to benefit from the effects of displacement-based filtering. In other words, after additional candidate calibrations have been removed by the displacement filter, the orientation filter can be applied again by removing a specified percentage of remaining candidate calibrations remaining in the candidate set with the largest deviations from the average (e.g., mean) orientation.

After filtering, the disclosed implementations can compute the "average" of the remaining calibrations left in the set of candidate calibrations. For example, the mean Z axis unit vector across all remaining calibrations after filtering can be computed as discussed previously, e.g., by adding the individual Z axis unit vectors of the remaining calibrations together to obtain another vector, and dividing that vector by its own length. Once the mean Z axis unit vector is determined, two mutually orthogonal X and Y axis unit vectors can be computed, e.g., at random. Next, a rotation matrix can be derived from these three unit vectors. Using this rotation matrix as a final value for R, the displacements for the remaining calibrations can be calculated, and the median value of these displacements can be used as the final translation vector T.

The following provides a pseudocode algorithm to implement the above-discussed mechanisms for computing R and T from an initial set of candidate calibrations.

---

Algorithm 1: Filtering and Averaging input:   Set of all calibrations C = [($R^1,T^1$) . . ($R^n,T^n$)]
output:  Calibration Estimate $c_{est}$
Function Main (C):
    p = ComputeFocusRegionMidPoint ( )
    $C_\theta$ = OrientationFilter (C,75)
    $C_{\theta\cdot D}$ = DisplacementFilter ($C_\theta$,50,p)
        $C_{\theta\cdot D\cdot\theta}$ = OrientationFilter ($C_{\theta\cdot D}$,75)

$$\vec{z}_{avg} = \frac{\sum_{i=1}^{n} R^i_{*,3}}{n}, R \in C_{\theta,D,\theta}$$

$R_{avg}$ = ComputeAverageRotationMatrix ($\vec{z}_{avg}$)
    foreach ($R^i,T^i$) ∈ $C_{\theta,D,\theta}$ do
        $R^i$ = $R_{avg}$
    D = ComputeDisplacement ($C_{\theta,D,\theta}$,p)
    $c_{est}$ = Sort $C_{\theta,D,\theta}$ by D and pick the median element
    return $c_{est}$
Function OrientationFilter (C,n):

$$\vec{z}_{avg} = \frac{\sum_{i=1}^{n} R^i_{*,3}}{n}$$

foreach ($R^i,T^i$) ∈ C do
        $\vec{z}_i = R^i_{*,3}$
        $\theta_i = \arccos\left(\frac{\vec{z}_i \cdot \vec{z}_{avg}}{\|\vec{z}_{avg}\| \|\vec{z}_i\|}\right)$ $C_\theta$ = Sort C by θ and pick the lowest n % values
    return $C_\theta$
Function ComputeDisplacement(C,p):
    foreach ($R^i,T^i$) ∈ C do
        $p_i$ = ReprojectToGround(p,$R^i,T^i$)
        $d_i$ = DistanceToCamera($p_i,R^i,T^i$)
    return D
Function DisplacementFilter(C,n,p):
    D = ComputeDisplacement(C,p)
    $C_D$ = Sort C by D and pick the middle n % values
    return $C_D$

---

Example Model Retraining Method

As noted above, the disclosed implementations can rely on image coordinates of automobile features to obtain candidate camera calibrations. One approach would be to simply design, from scratch, a trained model to perform automobile feature identification. However, this could require a significant amount of training data and training time.

An alternative approach is to repurpose an existing model that has already been trained. For example, consider a deep neural network that is trained to identify automobile models in images. The output layer of such a network has nodes that identify specific automobile models. However, earlier layers in such a network tend to identify more generic image features, such as edges, that are useful across a broader range of applications, including automobile feature identification as well as model identification. Thus, the disclosed implementations can start with a pre-trained model, such as a neural network, that has already been trained on a large data set to perform automobile model identification and retrain that model to identify vehicle features.

Figure 10:
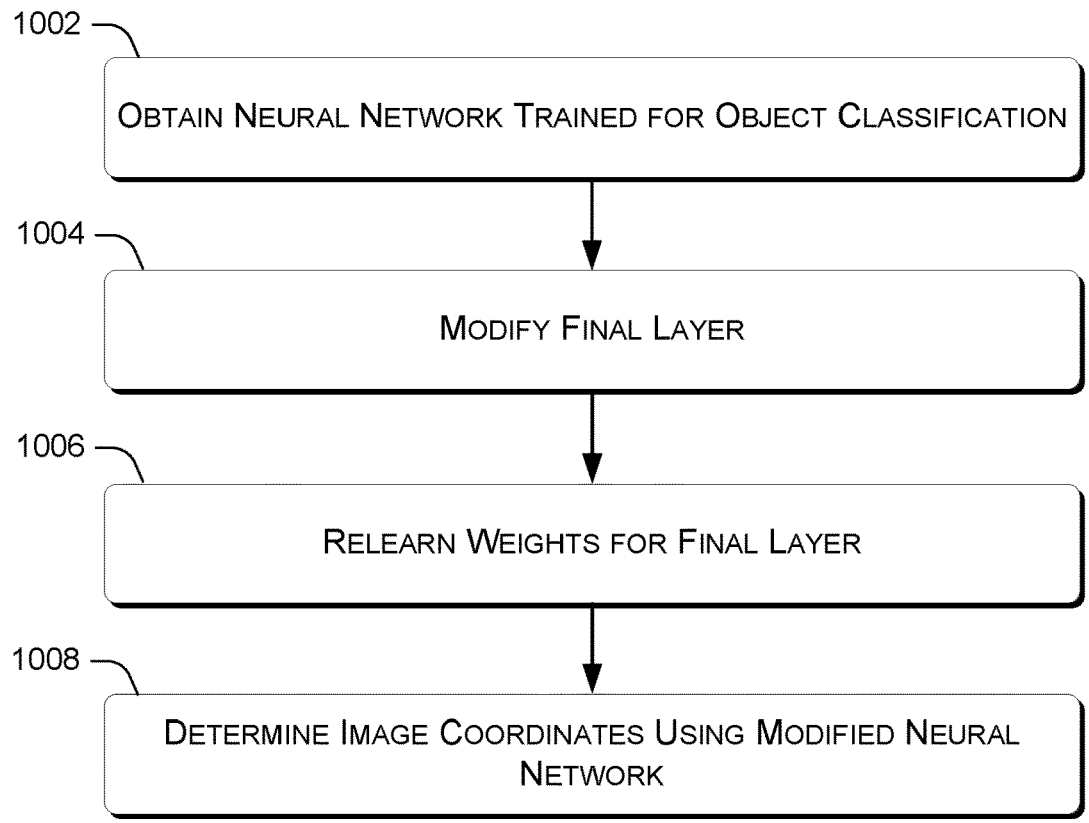

The following discussion presents an overview of functionality that can allow retraining of a model. FIG. 10 illustrates an exemplary method 1000, consistent with the present concepts. As discussed more below, method 1000 can be implemented can be implemented on many different types of devices, e.g., by one or more cloud servers, by a client device such as a laptop, tablet, or smartphone, or by combinations of one or more servers, client devices, directly on a camera, etc.

Method 1000 begins at block 1002, where a neural network that is trained to perform object classification is obtained. For example, the neural network can be trained to analyze images and classify automobiles in the images by make and model.

Method 1000 continues at block 1004, where the final layer of the neural network is modified. For example, output neurons that output make and model of automobiles can be replaced with output neurons that provide the image coordinates of specific features.

Method 1000 continues at block 1006, where weights for the final layer of the neural network are relearned. Note that the weights for previous layers of the neural network may be unaffected. This facilitates training the neural network quickly and using relatively sparse training data.

Method 1000 continues at block 1008, where the retrained neural network is used for feature identification. For example, input images can be processed to identify image coordinates of specific automobile features such as license plates, mirrors, tail lamps, etc.

Example Neural Networks

Figure 11:
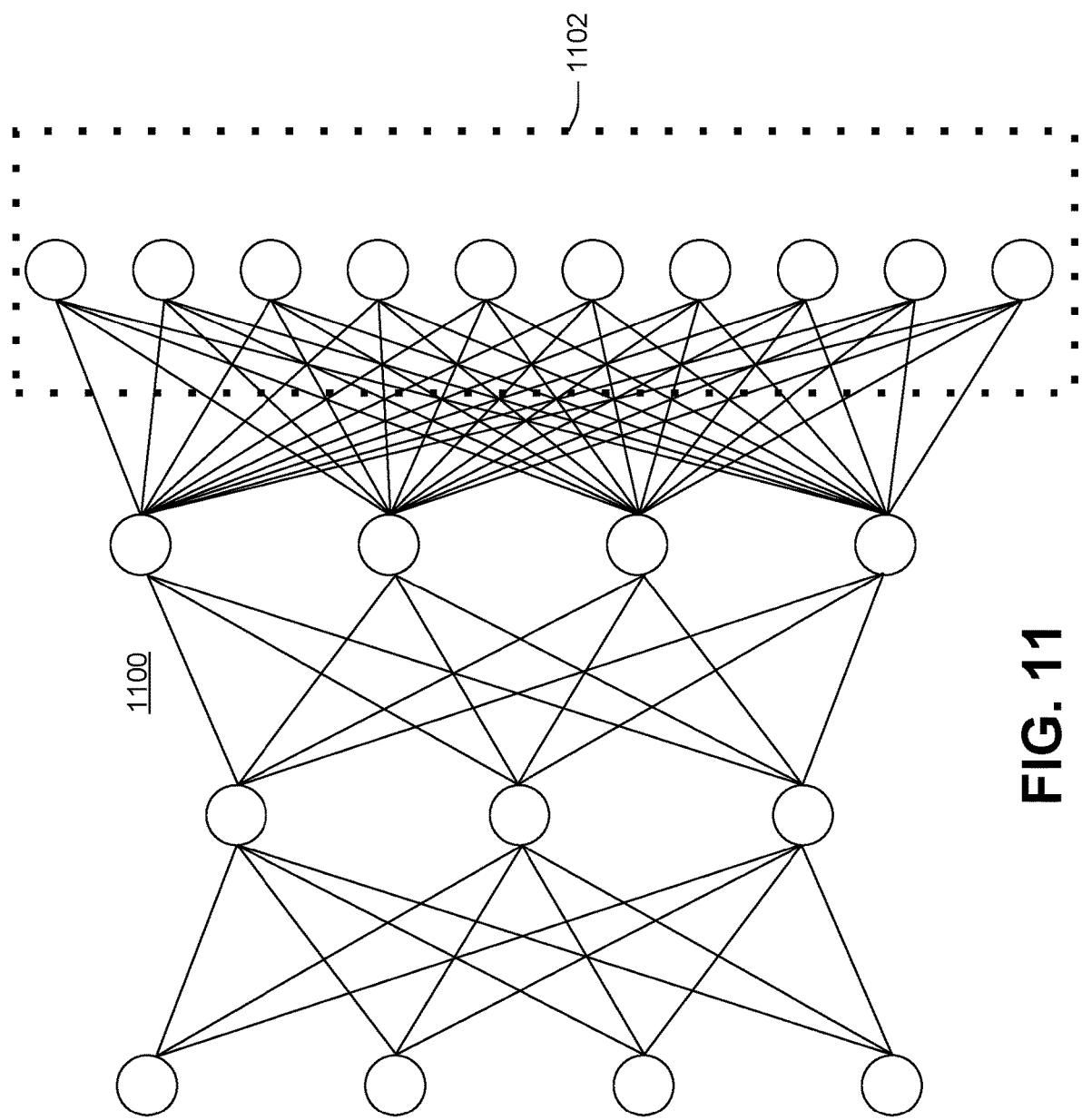
FIGS. 11 and 12 illustrate exemplary neural networks, consistent with some implementations of the present concepts.

FIG. 11 illustrates an exemplary neural network 1100. For illustration purposes, neural network 1100 is shown with four layers and relatively few nodes per layer. However, actual neural networks may involve far more layers and/or far more nodes per layer. Each node is connected by an edge to a node in the adjacent layer, and each edge has an associated weight (not shown). The weights are learned over time on training data.

Output layer 1102 in neural network 1100 includes ten nodes that output object classifications. For example, each node might output a value indicating whether an image includes a particular automobile model. In some cases, these nodes are Softmax outputs.

Figure 12:
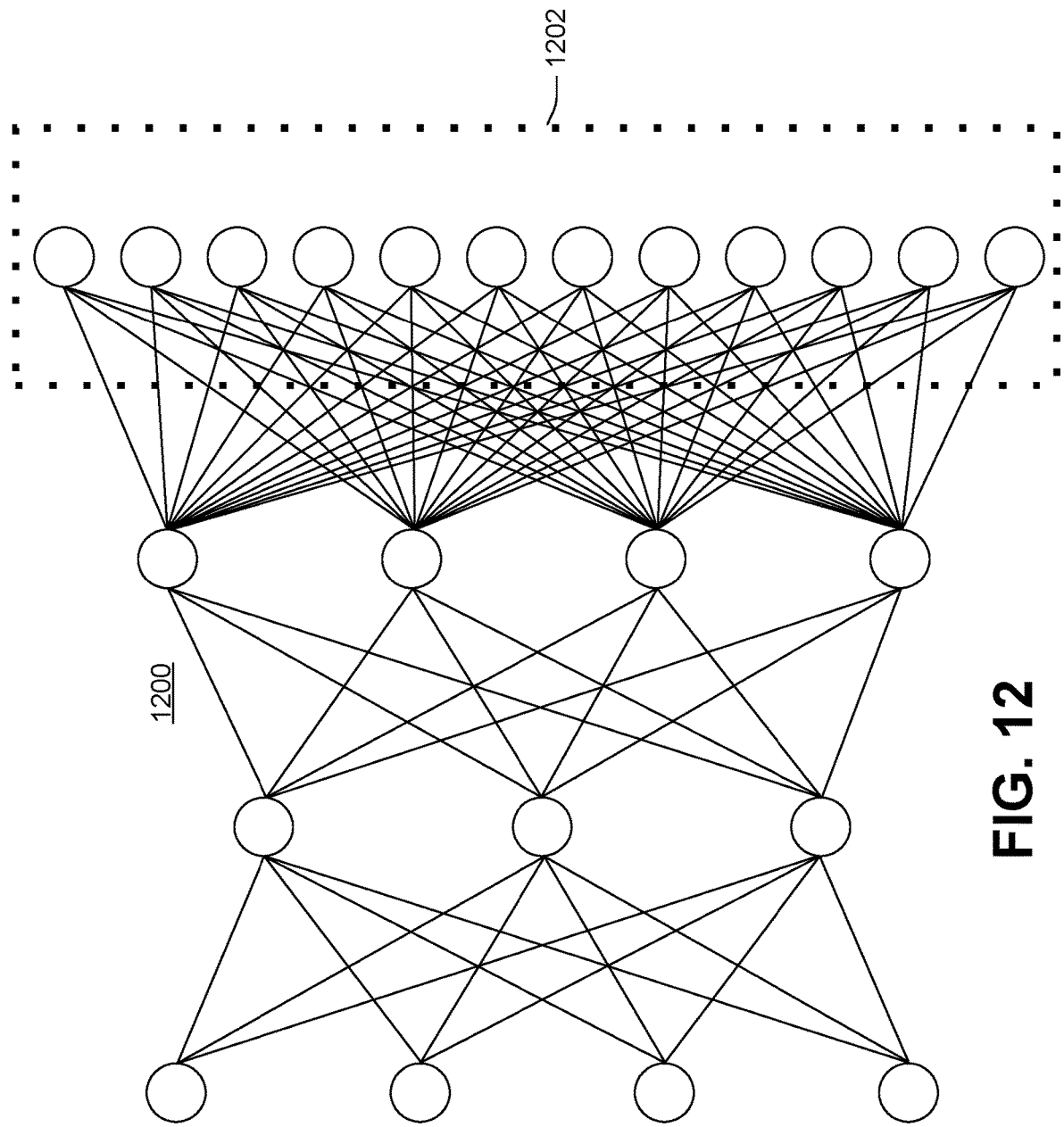

In block 1004 of method 1000, output layer 1102 is replaced as shown in FIG. 12 with output layer 1202 to create a modified neural network 1200. For example, each node in output layer 1202 might output a pixel coordinate for a given feature, e.g., the top-most node in output layer 1202 might output an x value for the left tail lamp, the next node in output layer 1202 might output an y value for the tail lamp, the next node might output an x value for the license plate, and so on. In some implementations, the Softmax outputs are replaced with regression outputs that identify either the x or y coordinate of a given vehicle feature.

Each regression output has a range from 0 to 1 representing the x and y coordinates normalized with respect to the width and height of the bounding box of the vehicle. For example, x=0.3, y=0.5 for a 300×500 car image indicates that the key-point is located at (90,250). One way to train the final layer is using manually annotated car images, e.g., pictures of automobiles from the rear with manually-identified left, right, and center tail lamps, left and right mirrors, and license plates. For each annotated image, various transformations can be performed to obtain additional training images. For example, transformations can include random crops in random aspect ratios by scaling the original image, random rotations by any angle between 0 and 360, and random moves by placing the car image at random locations in a new image. Similarly, the same transformations can be performed on a horizontal mirror image of the original image. This allows a single annotated training image to be converted into many more training images, and reduces the number of manually-annotated images that must be obtained.

Applications

Once the extrinsic camera parameters R and T are known, the following equation can be used to transform between real-world (GCS) coordinates $p_w$ and image coordinates $p_c$:

$$sp_c = C[R|T]p_w \quad \text{(equation 2)}$$

However, the mapping from the GCS coordinates to the image coordinates is not a one-to-one function, as we map from 3-dimensional coordinates to 2-dimensional coordinates.

Given a point P(u,v) in the image (the camera frame), equation 2 allows the point P to be mapped to an infinite ray in the real-world. In order to obtain the exact location of point P in the GCS, some additional information can be used, such as one of the GCS coordinates. Note that this is not necessary for certain applications, e.g., automobiles, provided that the road in the region of interest is approximately flat. Provided the road is approximately flat, the feature-points in vehicles are at known heights from the ground plane. Using the knowledge of P's height $h_p$, the 3D coordinates in GCS can be derived from Equation 1 by substituting z with $h_p$. Here, (x, y, $h_p$) denote the P's coordinates in the GCS. There are 3-unknowns, s, x and y which can be solved using 3-equations.

Now, consider the problem of estimating the speed of a car. The disclosed implementations can identify one of its feature-points, such as its tail-light, in two different frames at two different time points t1 and t2. Then, the image of the tail-light can be mapped to its GCS coordinate at t1 and t2, and the car's speed can be computed between the two time-instances. This can enable off-the-shelf traffic cameras to measure traffic speed without any dedicated sensors.

Other example applications can include near-miss detection, warning systems, etc. For example, suppose camera 102 is deployed near a dangerous intersection. The camera can monitor the distance between objects, such as vehicles and/or vehicles and pedestrians, over time to identify instances where the objects come within a threshold distance of each other. These can be reported, e.g., to a server. If the camera detects unusually frequent near-misses, this can suggest a dangerous intersection where additional safety measures might be appropriate.

As another example, the camera can detect the height of passing vehicles and emit a warning when a given vehicle is within a threshold height of a nearby structure, such as a bridge, overpass, etc. This can be used to prevent tall trucks from inadvertently running into such structures. As another example, the camera can detect traffic congestion by detecting when cars are moving relatively slowly.

Types of Objects used for Calibration

Generally, the disclosed implementations can leverage known physical dimensions of relatively common objects to calibrate a camera. As previously noted, the basic idea is that, given enough images, it is quite likely that some of the images will include relatively common objects. Given known dimensions of those common objects, one can compute candidate camera calibrations. While some of those calibrations will be inaccurate because the images do not always include the expected objects, these inaccurate calibrations can be removed using filtering techniques discussed elsewhere herein.

Other examples of suitable objects can include any objects with known physical dimensions that have fixed dimensions. For example, boats and airplanes are also generally built as specific models where each instance of a given model is identical, and thus is possible to obtain a data source of the physical dimensions of boat or airplane features.

Cloud Scenario

Figure 13:
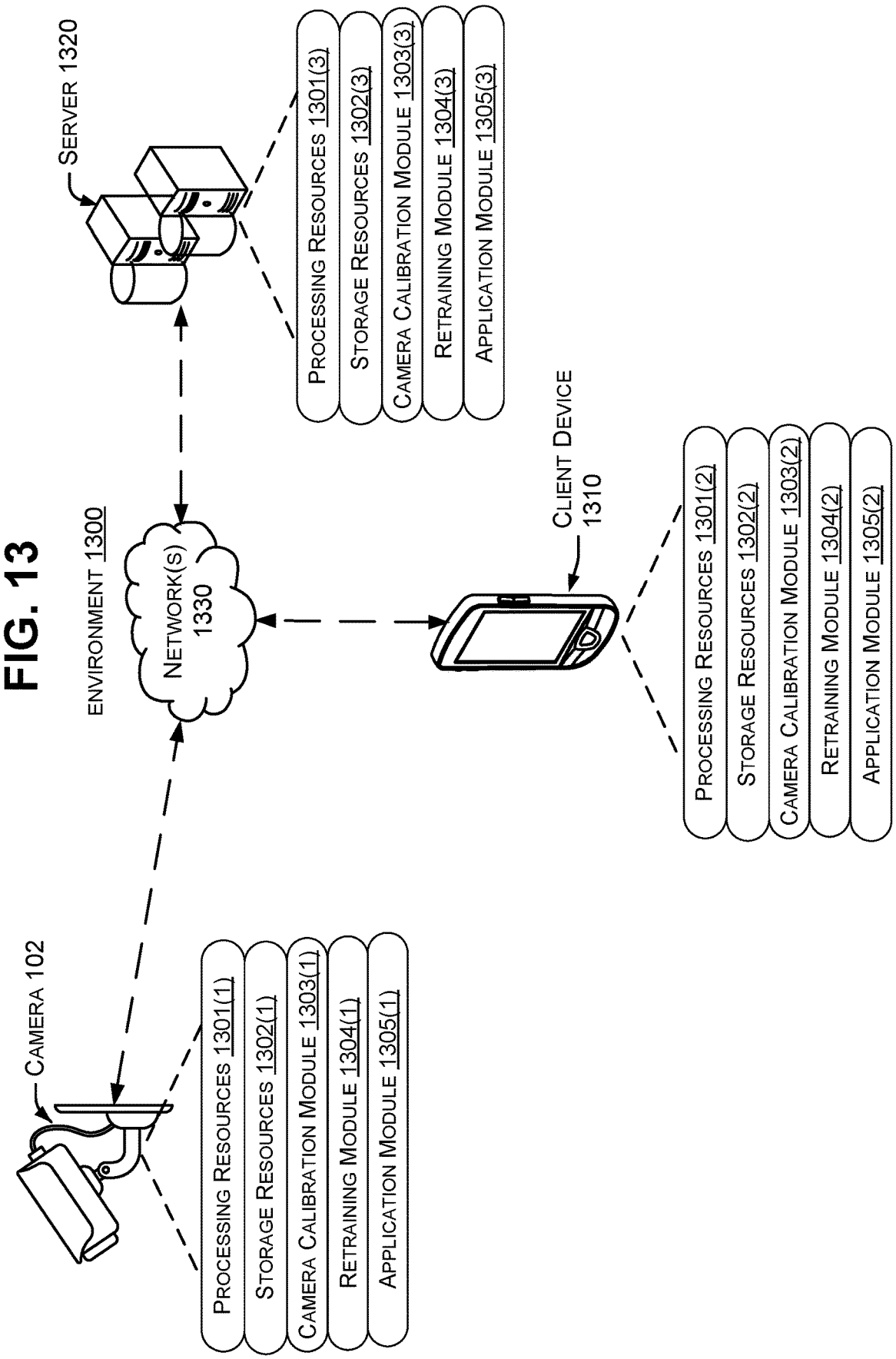
FIG. 13 illustrates an exemplary environment, consistent with some implementations of the present concepts.

The present implementations can be performed in various scenarios on various devices. FIG. 13 shows an example environment 1300 in which the present implementations can be employed, as discussed more below.

As shown in FIG. 13, environment 1300 includes camera 102, a client device 1310, and a server 1320 connected by one or more networks 1330. Note that the client device can be embodied both as a mobile device as shown in FIG. 13, as well as stationary devices such as desktops, server devices, etc. Likewise, the server 1320 can be implemented using various types of computing devices. In some cases, any of the devices shown in FIG. 13, but particularly server 1320, can be implemented in data centers, server farms, etc.

Certain components of the devices shown in FIG. 13 may be referred to herein by parenthetical reference numbers. For the purposes of the following description, the parenthetical (1) indicates an occurrence of a given component on the camera 102, (2) indicates an occurrence of a given component on the client device 1310, and (3) indicates an occurrence on the server 1320. Unless identifying a specific instance of a given component, this document will refer generally to the components without the parenthetical.

Generally, the devices 102, 1310, and 1320 may have respective processing resources 1301 and storage resources 1302, which are discussed in more detail below. The devices may also have various modules that function using the processing and storage resources to perform the techniques discussed herein, as discussed more below. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Generally, any of the devices shown in FIG. 13 can have a camera calibration module 1303, a retraining module 1304, and/or an application module 1305(1). The camera calibration module can perform camera calibration as discussed elsewhere herein, e.g., with respect to method 300 shown in FIG. 3. The retraining module can perform retraining of a machine learning model such as a neural network as discussed elsewhere herein, e.g., with respect to method 1000 shown in FIG. 10. The application module can perform functionality once the camera is calibrated, such as determining the speed of a vehicle from two or more images, near-miss detection, etc.

Although processing can be distributed across individual devices of environment 1300 in any fashion, the following provides a few exemplary techniques for doing so. In one implementation, the camera 102 can send images to server 1320, and the calibration module 1303(3) can calibrate the camera using functionality such as discussed above with respect to method 300. The final calibration can be locally stored on the server. Later, subsequent images can be provided from the camera to the server, and the server can perform application functionality such as speed detection, near-miss detection, or other camera applications as discussed elsewhere herein.

In other implementations, the camera 102 may self-calibrate, e.g., the camera calibration module 1303(1) may perform some or all of method 300 locally on the camera. Once calibrated, the camera may also perform application functionality locally on the camera, or can send the final calibration and subsequent images to the application module 1305(2) on the client device 1310 or 1305(3) on the server 1320 for subsequent application processing as discussed elsewhere herein.

Device Implementations

As noted above with respect to FIG. 13, environment 1300 includes several devices, including a camera 102, a client device 1310, and a server 1320. Generally, so long as a device has some computational hardware, the device can be used to perform camera calibration, retraining, and/or application functionality in accordance with the disclosed implementations. Of course, not all device implementations can be illustrated and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods described herein can be performed on a single computing device and/or distributed across multiple computing devices that communicate over network(s) 160. Without limitation, network(s) 160 can include one or more local area networks (LANs), wide area networks (WANs), the Internet, and the like.

Further Examples

Various device examples are described above. Additional examples are described below. One example includes a method performed on a computing device comprising obtaining images captured by a camera, identifying image coordinates of object features of objects shown in the images, and accessing a database of real-world distances between the object features for different object types. The method also comprises using the real-world distances and the image coordinates of the object features, determining multiple candidate camera calibrations for the camera, filtering out at least some of the multiple candidate camera calibrations to obtain remaining calibrations, and obtaining a final calibration for the camera from the remaining calibrations.

Another example can include any of the above and/or below examples where the objects comprising automobiles and the different object types comprising different automobile models.

Another example can include any of the above and/or below examples where determining multiple candidate camera calibrations comprises determining multiple automobile model-specific candidate camera calibrations for an individual automobile shown in an individual image.

Another example can include any of the above and/or below examples where determining the multiple candidate camera calibrations for the individual automobile shown in the individual image comprises providing, to a perspective-n-point solver, respective image coordinates of multiple automobile features in the individual image, first real-world coordinates of the multiple automobile features for a first automobile model, and second real-world coordinates of the multiple automobile features for a second automobile model and obtaining, from the perspective-n-point solver, a first candidate camera calibration that is specific to the first automobile model and a second candidate camera calibration that is specific to the second automobile model.

Another example can include any of the above and/or below examples where the multiple automobile features include at least a left tail lamp and a right side mirror.

Another example can include any of the above and/or below examples where the first real-world coordinates comprise first three-dimensional coordinates of the left tail lamp and the right side mirror for the first automobile model, and the second real-world coordinates comprise second three-dimensional coordinates of the left tail lamp and the right side mirror for the second automobile model.

Another example includes a system comprising a camera configured to capture images of objects, a hardware processing unit, a storage resource storing computer-readable instructions which, when executed by the hardware processing unit, cause the hardware processing unit to: obtain the images captured by the camera, determine image coordinates of object features of objects shown in the images, provide the image coordinates and real-world distances between the object features for different object types to a perspective-n-point solver, the perspective-n-point solver outputting candidate camera calibrations for the different object types, filter out at least some of the multiple candidate camera calibrations obtain remaining calibrations, and use the remaining calibrations to obtain a final calibration of the camera.

Another example can include any of the above and/or below examples where the instructions, when executed by the hardware processing unit, cause the hardware processing unit to calculate respective Z axis unit vectors for the multiple candidate camera calibrations, determine a mean Z axis unit vector across the multiple candidate camera calibrations, and remove, from the multiple candidate camera calibrations, certain candidate camera calibrations having respective Z axis unit vectors with relatively large angular deviations from the mean Z axis unit vector.

Another example can include any of the above and/or below examples where the instructions, when executed by the hardware processing unit, cause the hardware processing unit to calculate respective camera displacements for the multiple camera calibrations, determine a median camera displacement across the multiple candidate camera calibrations, and remove, from the multiple candidate camera calibrations, at least some candidate camera calibrations having larger camera displacements than the median camera displacement and at least some other candidate camera calibrations having smaller camera displacements than the median camera displacement.

Another example can include any of the above and/or below examples where the instructions, when executed by the hardware processing unit, cause the hardware processing unit to perform at least one averaging operation on the remaining calibrations to obtain the final calibration.

Another example can include any of the above and/or below examples where the instructions, when executed by the hardware processing unit, cause the hardware processing unit to obtain further images separated in time, using the final calibration of the camera, determine real-world locations of a particular object in the further images, and calculate a speed of the particular object.

Another example can include any of the above and/or below examples where the instructions, when executed by the hardware processing unit, cause the hardware processing unit to process further images using the final calibration to determine real-world locations of various objects shown in the further images and use the real-world locations of the various object to detect near-miss instances where two different objects come within a specified distance of one another.

Another includes a system comprising a hardware processing unit and storage resources storing computer-readable instructions which, when executed by the hardware processing unit, cause the hardware processing unit to: obtain a neural network that is trained to classify objects found in images, the neural network having a final layer that identifies specific object types, modify the final layer of the neural network to obtain a modified neural network, the modified neural network outputting image coordinates of specific object features, relearn weights of the final layer of the modified neural network using training images having annotated locations of the specific object features, and determine image coordinates of individual object features in other images using the modified neural network.

Another example can include any of the above and/or below examples where the objects comprising automobiles, the specific object features including different external automobile features.

Another example can include any of the above and/or below examples where the instructions, when executed by the hardware processing unit, cause the hardware processing unit to process the training images to compute bounding boxes around individual automobiles shown in the training images and determine the image coordinates of the automobile features relative to the bounding boxes.

Another example can include any of the above and/or below examples where the instructions, when executed by the hardware processing unit, cause the hardware processing unit to include regression outputs in the final layer of the neural network, the regression outputs providing normalized x and y values between 0 and 1 for individual automobile features, the normalized x and y values characterizing placement of the individual automobile features relative to the bounding boxes.

Another example can include any of the above and/or below examples where the instructions, when executed by the hardware processing unit, cause the hardware processing unit to given an annotated training image with labeled feature points, produce multiple training images by performing transformations on the annotated training image.

Another example can include any of the above and/or below examples where the transformations comprising random crops in random aspect ratios obtained by scaling the annotated training image.

Another example can include any of the above and/or below examples where the transformations comprising random rotations of the annotated training image.

Another example can include any of the above and/or below examples where the transformations comprising random movement of an individual automobile in the annotated training image.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
    obtaining images captured by a camera;
    identifying image coordinates of object features of objects shown in the images;
    accessing a database of real-world distances between the object features for different object types;
    obtaining, from the database, at least a first real-world distance between two object features for a first object type and a second real-world distance between the two object features for a second object type;
    using the real-world distances and the image coordinates of the object features, determining multiple candidate camera calibrations for the camera, the multiple candidate camera calibrations comprising at least two candidate calibrations determined for a specific object in a specific image, including at least a first candidate calibration determined using the first real-world distance between the two object features for the first object type and a second candidate calibration determined using the second real-world distance between the two object features for the second object type;
    filtering out at least some of the multiple candidate camera calibrations to obtain remaining calibrations; and
    obtaining a final calibration for the camera from the remaining calibrations.

2. The method of claim 1, the objects comprising automobiles and the different object types comprising different automobile models.

3. The method of claim 2, wherein the specific object comprises a specific automobile in the specific image, the first candidate calibration is determined for the specific automobile using known dimensions of a first automobile model, and the second candidate calibration is determined for the specific automobile using known dimensions of a second automobile model other than the first automobile model.

4. The method of claim 3, wherein the determining the multiple candidate camera calibrations comprises:
    for the specific automobile shown in the specific image:
        providing, to a perspective-n-point solver, respective image coordinates of multiple automobile features in the specific image, first real-world coordinates of the multiple automobile features for the first automobile model, and second real-world coordinates of the multiple automobile features for the second automobile model; and
        obtaining, from the perspective-n-point solver, a first candidate camera calibration that is specific to the first automobile model and a second candidate camera calibration that is specific to the second automobile model.

5. The method of claim 4, wherein the multiple automobile features include at least a left tail lamp and a right side mirror.

6. The method of claim 5, wherein the first real-world coordinates comprise first three-dimensional coordinates of the left tail lamp and the right side mirror for the first automobile model, and the second real-world coordinates comprise second three-dimensional coordinates of the left tail lamp and the right side mirror for the second automobile model.

7. A system comprising:
    a camera configured to capture images of objects;
    a hardware processing unit; and a storage resource storing computer-readable instructions which, when executed by the hardware processing unit, cause the hardware processing unit to:

obtain the images captured by the camera;

determine image coordinates of object features of objects shown in the images;

provide the image coordinates and real-world distances between the object features for different object types to a perspective-n-point solver, the perspective-n-point solver outputting multiple candidate camera calibrations for the different object types, the multiple candidate camera calibrations including at least two different candidate calibrations derived from a specific object in a specific image;

filter out at least some of the multiple candidate camera calibrations to obtain remaining calibrations; and use the remaining calibrations to obtain a final calibration of the camera.

8. The system of claim 7, wherein the instructions, when executed by the hardware processing unit, cause the hardware processing unit to:

calculate respective Z axis unit vectors for the multiple candidate camera calibrations;

determine a mean Z axis unit vector across the multiple candidate camera calibrations; and remove, from the multiple candidate camera calibrations, certain candidate camera calibrations having respective Z axis unit vectors with relatively large angular deviations from the mean Z axis unit vector.

9. The system of claim 7, wherein the instructions, when executed by the hardware processing unit, cause the hardware processing unit to:

calculate respective camera displacements for the multiple candidate camera calibrations;

determine a median camera displacement across the multiple candidate camera calibrations; and remove, from the multiple candidate camera calibrations, at least some candidate camera calibrations having larger camera displacements than the median camera displacement and at least some other candidate camera calibrations having smaller camera displacements than the median camera displacement.

10. The system of claim 7, wherein the instructions, when executed by the hardware processing unit, cause the hardware processing unit to:

perform at least one averaging operation on the remaining calibrations to obtain the final calibration.

11. The system of claim 7, wherein the instructions, when executed by the hardware processing unit, cause the hardware processing unit to:

obtain further images separated in time;

using the final calibration of the camera, determine real-world locations of a particular object in the further images; and calculate a speed of the particular object.

12. The system of claim 7, wherein the instructions, when executed by the hardware processing unit, cause the hardware processing unit to:

process further images using the final calibration to determine real-world locations of various objects shown in the further images; and use the real-world locations of the various object to detect near-miss instances where two different objects come within a specified distance of one another.

13. The method of claim 1, wherein the multiple candidate camera calibrations are determined without using a classifier to determine object types of the objects shown in the images.

14. The method of claim 13, further comprising:

using a neural network to detect the object features in the images.

15. A system comprising:

a camera configured to capture images of objects;

a hardware processing unit; and a storage resource storing computer-readable instructions which, when executed by the hardware processing unit, cause the hardware processing unit to:

obtain first images captured by the camera;

provide the first images to a camera calibration module, the camera calibration module configured to determine a final camera calibration for the camera by filtering multiple different candidate calibrations derived from a specific object in a specific first image;

obtain the final camera calibration from the camera calibration module;

obtain second images captured by the camera; and using the final camera calibration, perform at least one application function on the second images.

16. The system of claim 15, further comprising the camera calibration module.

17. The system of claim 15, wherein the computer-readable instructions, when executed by the hardware processing unit, cause the hardware processing unit to:

send the first images to a server that provides the camera calibration module; and receive the final camera calibration from the server.

18. The system of claim 15, the at least one application function comprising detecting near-misses in the second images.

19. The system of claim 15, the at least one application function comprising detecting traffic congestion in the second images.

20. The system of claim 15, the at least one application function comprising detecting speeds of objects present in the second images.

* * * * *